US012579502B2

(12) United States Patent
Homma

(10) Patent No.: US 12,579,502 B2
(45) Date of Patent: Mar. 17, 2026

(54) DELIVERY FEE CALCULATION DEVICE

(71) Applicant: FUJIFILM Corporation, Tokyo (JP)

(72) Inventor: Mihoko Homma, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 19/086,801

(22) Filed: Mar. 21, 2025

(65) Prior Publication Data

US 2025/0217755 A1    Jul. 3, 2025

Related U.S. Application Data

(63) Continuation of application No. PCT/JP2023/029249, filed on Aug. 10, 2023.

(30) Foreign Application Priority Data

Sep. 21, 2022    (JP) ................................. 2022-150579

(51) Int. Cl.
G06Q 10/0834    (2023.01)
(52) U.S. Cl.
CPC .............................. G06Q 10/08345 (2013.01)
(58) Field of Classification Search
CPC ............................................... G06Q 10/08345
See application file for complete search history.

(56) References Cited

U.S. PATENT DOCUMENTS

| 2021/0110442 A1* | 4/2021 | Fujiwara | .............. G06Q 20/386 |
| 2021/0318912 A1* | 10/2021 | Hashimoto | ......... H04L 41/5045 |
| 2022/0270037 A1* | 8/2022 | You | .................... G06Q 10/0832 |

FOREIGN PATENT DOCUMENTS

| JP | S58-082358 A | 5/1983 |
| JP | 4491265 B2 | 6/2010 |
| JP | 2011-108090 A | 6/2011 |
| JP | 2020-046846 A | 3/2020 |
| JP | 2020-052590 A | 4/2020 |

OTHER PUBLICATIONS

Peter Englund, Moving costs and housing demand: Are recent movers really in equilibrium?, 1991, p. 299-320 (Year: 1991).*
International Search Report issued in PCT/JP2023/029249; mailed Oct. 24, 2023.
Written Opinion of the International Searching Authority issued in PCT/JP2023/029249; mailed Oct. 24, 2023.

* cited by examiner

*Primary Examiner* — Ibrahim N El-Bathy
(74) *Attorney, Agent, or Firm* — Studebaker Brackett PLLC

(57)    ABSTRACT

In a case where delivery is completed, an input of a delivery destination site work amount is performed, and in a case where the delivery destination site work amount is input, a calculation unit calculates the delivery fee based on a current delivery record. In addition, a prediction unit predicts the delivery fee based on a past delivery record. Next, the two delivery fees (the delivery fee calculated by the calculation unit and the delivery fee predicted by the prediction unit) are compared, and a comparison result is notified to the billing destination for the delivery fee.

13 Claims, 8 Drawing Sheets

_42_

| IN-SITE WORK INFORMATION | IN-SITE WORK AMOUNT |
|---|---|
| GATE PROCEDURES REQUIRED | 50 |
| DISTANCE FROM GATE TO DELIVERY DESTINATION | |
| 100 m OR MORE | 50 |
| LEVEL DIFFERENCE FROM GATE TO DELIVERY DESTINATION | |
| THREE OR MORE LAYERS (WITH ELEVATOR) | 50 |
| THREE OR MORE LAYERS (WITHOUT ELEVATOR) | 100 |
| ⋮ | ⋮ |

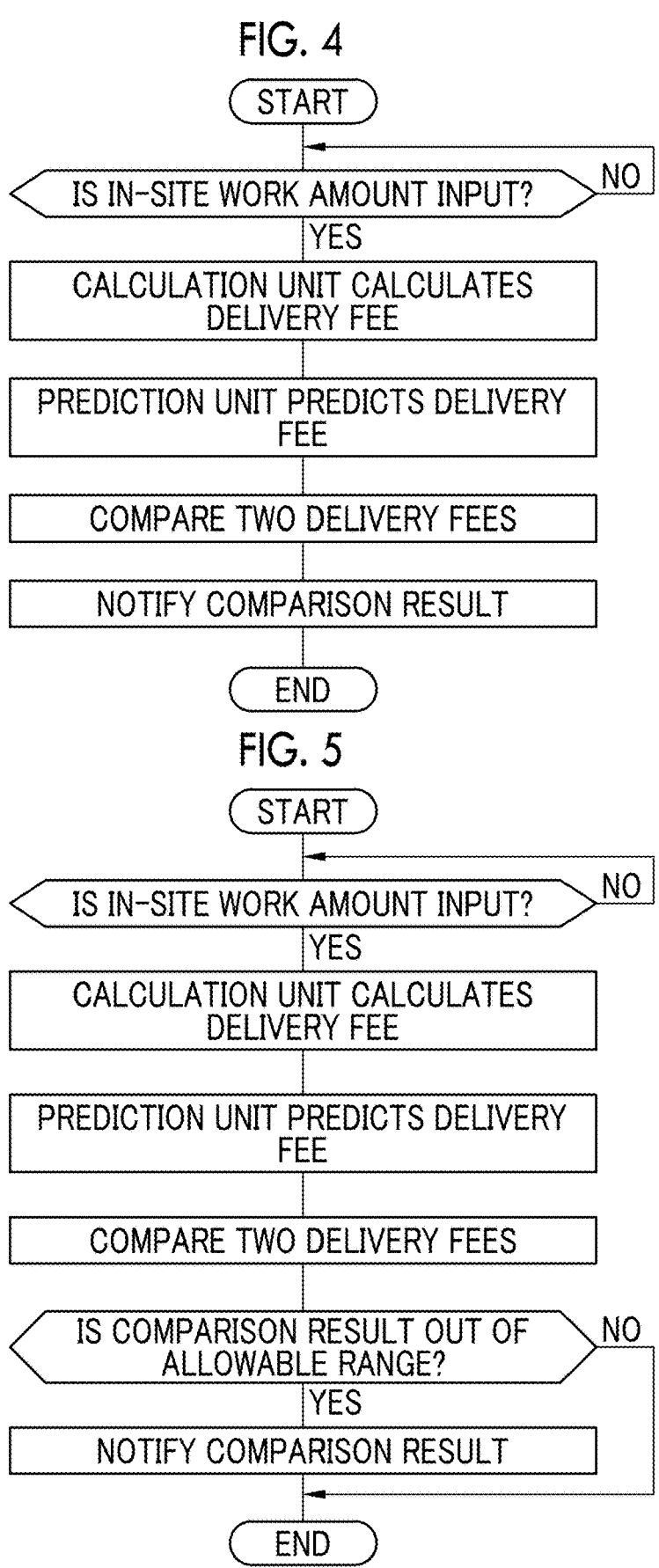

FIG. 4

START

IS IN-SITE WORK AMOUNT INPUT?    NO

YES

CALCULATION UNIT CALCULATES DELIVERY FEE

PREDICTION UNIT PREDICTS DELIVERY FEE

COMPARE TWO DELIVERY FEES

NOTIFY COMPARISON RESULT

END

FIG. 5

START

IS IN-SITE WORK AMOUNT INPUT?    NO

YES

CALCULATION UNIT CALCULATES DELIVERY FEE

PREDICTION UNIT PREDICTS DELIVERY FEE

COMPARE TWO DELIVERY FEES

IS COMPARISON RESULT OUT OF ALLOWABLE RANGE?    NO

YES

NOTIFY COMPARISON RESULT

END

FIG. 6

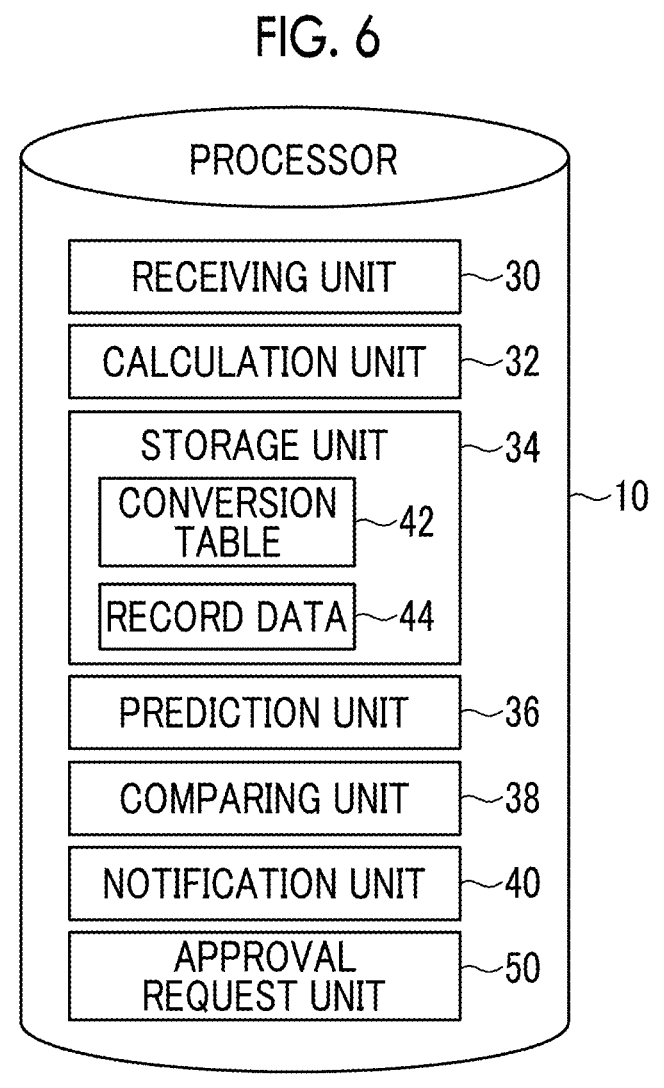

PROCESSOR

RECEIVING UNIT ~30

CALCULATION UNIT ~32

STORAGE UNIT ~34

CONVERSION TABLE ~42

RECORD DATA ~44

PREDICTION UNIT ~36

COMPARING UNIT ~38

NOTIFICATION UNIT ~40

APPROVAL REQUEST UNIT ~50

~10

DELIVERY FEE CALCULATION DEVICE

CROSS-REFERENCE TO RELATED APPLICATIONS

This application is a Continuation of PCT International Application No. PCT/JP2023/029249 filed on 10 Aug. 2023, which claims priority under 35 U.S.C § 119(a) to Japanese Patent Application No. 2022-150579 filed on 21 Sep. 2022. The above application is hereby expressly incorporated by reference, in its entirety, into the present application.

BACKGROUND OF THE INVENTION

1. Field of the Invention

The present invention relates to a delivery fee calculation device that calculates a delivery fee.

2. Description of the Related Art

As described in JP4491265B and JP2011-108090A below, a system that determines a delivery fee in consideration of a delivery route is known.

SUMMARY OF THE INVENTION

However, in the related art, the delivery destination site work amount indicating the work amount of the delivery side that occurs from reaching the address of the delivery destination to completing the delivery is not considered, and there is a problem that the burden on the delivery side is large. That is, examples of delivery destination site work include passing through a gate for entering the site of the delivery destination, moving from the gate to the delivery destination by foot, stairs, an elevator, or the like, passing through a reception for entering a department of the delivery destination, moving or waiting for actually delivering the package to the department or the person in charge of the delivery destination after passing through the reception, and the like. However, in the related art, such work cannot be billed, and the burden falls on the delivery side.

A method of setting the delivery fee in consideration of the delivery destination site work amount by the delivery side may also be considered in response to the above-described problem. However, in this case, there is a problem in that the billing destination of the delivery fee does not have an opportunity to confirm whether the delivery fee is appropriate or not, and therefore there is a problem where the delivery fee is set unreasonably high and the billing destination for the delivery fee suffers a disadvantage.

The present invention has been made in view of the above-described background, and an object of the present invention is to provide a delivery fee calculation device that can prevent a disadvantage of a billing destination of a delivery fee while reducing a burden on a delivery side.

In order to solve the above-described problem, a delivery fee calculation device comprises a processor, in which the processor receives an input of a delivery destination site work amount indicating a work amount of a delivery side that occurs from reaching a delivery destination address to completing delivery, calculates a delivery fee using the delivery destination site work amount, stores a correspondence relationship between a delivery destination and a delivery destination site work amount as a past delivery record, predicts the delivery fee in a case where a new delivery request is received, using the correspondence relationship, compares the predicted delivery fee with a delivery fee calculated after achievement of the delivery request, and notifies a billing destination for the delivery fee of a comparison result.

It is preferable that the processor performs the notification in a case where the comparison result is out of a predetermined allowable range.

It is preferable that the processor requests approval of the delivery fee calculated after the achievement of the delivery request from the billing destination in a case where the comparison result is out of the allowable range.

It is preferable that the processor determines whether a cause of the comparison result being out of the allowable range is due to the delivery destination or the delivery side in a case where the comparison result is out of the allowable range.

It is preferable that the processor receives an input of in-site work information that is a determination basis of the delivery destination site work amount, presents the in-site work information and requests the approval, determines that the cause is due to the delivery destination in a case where the request for the approval is accepted, and determines that the cause is due to the delivery side in a case where the request for the approval is not accepted.

It is preferable that the processor evaluates a reliability degree of the delivery side by using at least one of a number or a frequency of cases where the comparison result is out of the allowable range as a result of the determination.

It is preferable that the processor defines a size of the allowable range based on the reliability degree on the delivery side.

It is preferable that the processor stores a history of processing related to the delivery on a blockchain.

According to the present invention, it is possible to prevent a disadvantage of a billing destination of a delivery fee while reducing a burden on a delivery side.

BRIEF DESCRIPTION OF THE DRAWINGS

FIG. 4 is a flowchart showing a flow of processing of a first embodiment.

FIG. 5 is a flowchart showing a flow of processing of a second embodiment.

FIG. 6 is an explanatory diagram showing a configuration of the processor.

DESCRIPTION OF THE PREFERRED EMBODIMENTS

First Embodiment

Figure 1:
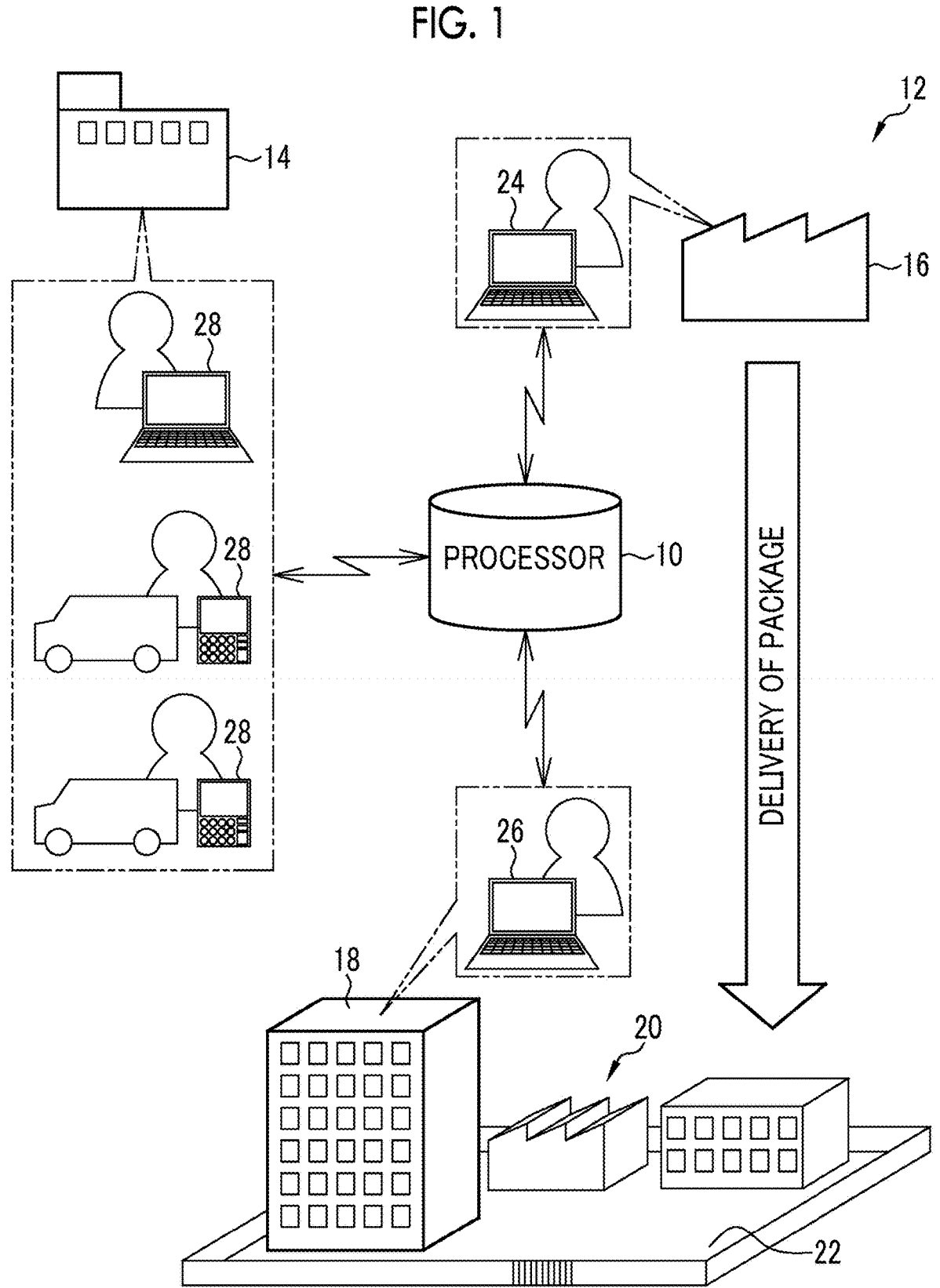
FIG. 1 is a schematic diagram showing a configuration of a delivery support system.

FIG. 1 shows a delivery support system 12 comprising a processor 10 (delivery fee calculation device) according to the embodiment of the present invention. The delivery support system 12 supports delivery of a package. The package is delivered by a delivery carrier 14 (delivery side). The delivery carrier 14 is requested by a consignor 16 or a delivery destination 18 to deliver the package from the consignor 16 to the delivery destination 18. In the present embodiment, the delivery destination 18 is a building (sixth floor) present within a site 22 of a delivery destination company 20.

The processor 10 executes a delivery support program and implements various functions in accordance with the execution of the delivery support program. The delivery support program is executed by, for example, starting up application software for delivery request on a terminal of a request source (a terminal 24 of the consignor 16 or a terminal 26 of the delivery destination 18) in a case of requesting delivery.

The processor 10 may be one terminal itself (or a part of such one terminal), such as a dedicated terminal provided separately from the terminal 24, the terminal 26, and the terminal 28 of the delivery carrier, but the present invention is not limited to an example in which the processor 10 is configured from such one terminal (the terminal itself or the part thereof). A plurality of such terminals (the terminal itself or the part thereof) may be gathered, and may function as the processor 10 in cooperation with each other.

In a case where the delivery support program is executed, a new delivery request can be started up through designation of delivery conditions, selection of delivery carriers, and the like. The delivery condition is a billing destination for delivery fees, a form of a package (weight, type, quantity, and the like), a form of delivery (delivery location, delivery time, and the like), and detailed conditions (presence or absence of parking lot, designation of parking lot, presence or absence of unloading, designation of unloading, details of delivery route, and the like). By designating the delivery condition, candidates of the delivery carrier 14 capable of delivering under the designated delivery condition are extracted, and the delivery carrier to which the delivery request is made can be selected from the extracted candidates. In a case where a delivery carrier is selected (for example, the delivery carrier 14 is selected), the request is transmitted to the terminal 28 of the selected delivery carrier 14, and in a case where the request is accepted by the terminal 28 of the delivery carrier 14, the start of the delivery request is completed. Then, the delivery of the package is performed in accordance with the delivery request.

Figures 2, 3:
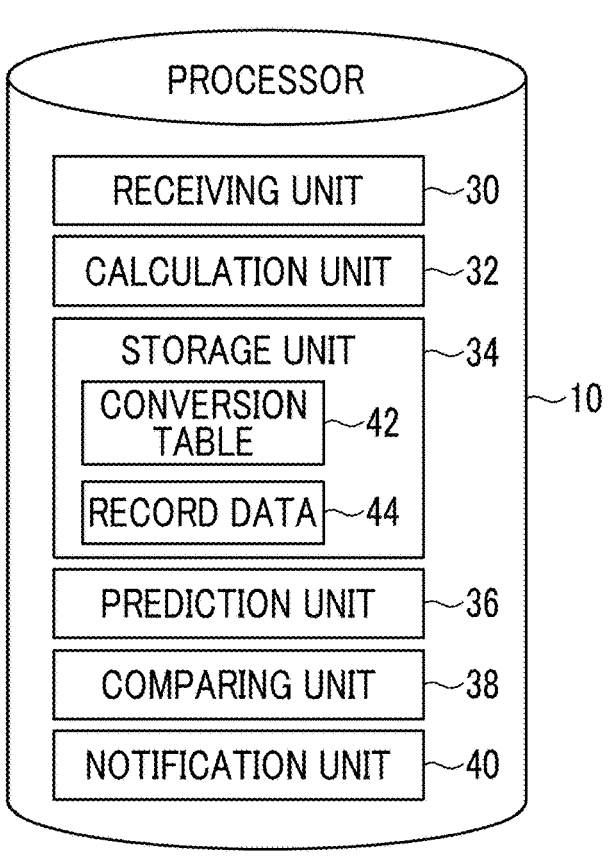
FIG. 2 is an explanatory diagram showing a configuration of a processor.
FIG. 3 is an explanatory diagram of a conversion table.

In addition, in a case where the delivery support program is executed, as shown in FIG. 2, the processor 10 functions as a receiving unit 30, a calculation unit 32, a storage unit 34, a prediction unit 36, a comparing unit 38, and a notification unit 40.

The receiving unit 30 receives an input of a delivery destination site work amount. The delivery destination site work amount indicates the amount of work (work amount) that occurs on the delivery side (delivery carrier 14) from reaching the address of the delivery destination 18 (the address of the site 22 of the delivery destination company 20) to completing the delivery to the delivery destination 18. The receiving unit 30 receives an input of the in-site work information that is the basis for determining the delivery destination site work amount. The in-site work information is, for example, the presence or absence of a gate for entering the site, the type and required time of processing necessary for passing through the gate, the distance and required time from passing through the gate to the delivery destination 18, the level difference between the gate and the delivery destination, the presence or absence of an elevator, the type and required time of processing necessary for delivery at the delivery destination 18, and the like.

The input of the in-site work information is performed, for example, in a format of questions. Specifically, the delivery carrier 14 reports the completion of the request to the processor 10 via the terminal 28 in a case where the delivery is completed. In response to this report, the receiving unit 30 transmits questions such as "Is there a gate to the site?" or "What is the distance from the gate to the delivery destination?" to the terminal 28. Then, the answer to the question is input as the in-site work information. Of course, a configuration may be adopted in which the in-site work information is input in a format other than the above-described format. In this case, for example, a configuration can be considered in which the in-site work information is input from the terminal 28 of the delivery carrier 14 in accordance with a predetermined format after the completion of the request, and the in-site work information is input to the receiving unit 30 together with the completion report of the request.

The calculation unit 32 calculates the delivery fee using the delivery condition and the delivery destination site work amount. Specifically, in a case where the calculation unit 32 receives the report of completion of the delivery request from the terminal 28 of the delivery carrier 14, the calculation unit 32 refers to the delivery condition of the request and calculates a delivery fee (basic delivery fee) from the consignor 16 to the address of the delivery destination 18 based on the address of the consignor 16, the address of the delivery destination 18, and the like. In addition, the calculation unit 32 determines the delivery destination site work amount based on the in-site work information and calculates an additional amount based on the determined delivery destination site work amount. Then, the final delivery fee to be billed to the request source (the billing destination of the delivery fee) is calculated by adding the additional amount to the basic delivery fee.

A conversion table 42 used in a case of calculating an additional amount to be added to the basic delivery fee is stored in the storage unit 34. As shown in FIG. 3, the conversion table 42 shows a correspondence relationship between each piece of the in-site work information and an addition value to the delivery destination site work amount, and the calculation unit 32 obtains the corresponding delivery destination site work amount for each piece of the in-site work information by collating each piece of the in-site work information with the conversion table 42, and uses the total of the obtained delivery destination site work amounts as the final delivery destination site work amount. In the present embodiment, the value equivalent to the additional amount is set as the delivery destination site work amount, and the value of the final delivery destination site work amount obtained as described above is calculated as the additional amount.

For example, in a case where gate procedures are required (presentation of identification card at the gate, entry (input) of purpose of passage, and the like), a distance from the gate to the delivery destination is 100 m or more, and a level difference from the gate to the delivery destination is three or more layers (with an elevator), the delivery destination site work amount (additional amount (yen)) is "50 (yen)" due to the gate procedures, "50 (yen)" due to the distance to the delivery destination, and "50 (yen)" due to the level difference (with an elevator), for a total of "150 (yen)". In this example, an amount obtained by adding the additional amount of 150 yen to the basic delivery fee is billed to the billing destination as the final delivery fee.

Returning to FIG. 2, the delivery record of the delivery to the delivery destination 18 as described above is stored in the storage unit 34 as record data 44. The record data 44 includes the identification information of the consignor 16, the identification information of the delivery destination 18, the identification information of the delivery carrier 14, the type of the package, the delivery condition, the basic delivery fee or the additional amount, and the delivery destination site work amount or the in-site work information that is the basis of the additional amount. The information, such as a video or a movement trajectory of a drive recorder mounted on a vehicle used for delivery, and a movement trajectory obtained from an IC tag attached to the package, may be included in the record data 44.

The prediction unit 36 calculates the current delivery fee based on the past record data 44. That is, the current delivery fee is predicted by using the record data 44 before the current delivery record is stored as the record data 44. The prediction unit 36 predicts the delivery fee using the same method as the method used by the calculation unit 32 to calculate the delivery fee. That is, the delivery fee (basic delivery fee) from the consignor 16 to the address of the delivery destination 18 is calculated with reference to the delivery condition. In addition, the delivery destination site work amount (additional amount) is determined based on the in-site work information in the past delivery with reference to the record data 44. Then, the delivery fee obtained by adding the additional amount to the basic delivery fee is predicted as the current delivery fee.

The comparing unit 38 compares the delivery fee calculated by the calculation unit 32 with the delivery fee predicted by the prediction unit 36. The notification unit 40 notifies the comparison result (the two types of delivery fees: the delivery fee calculated by the calculation unit 32 and the delivery fee predicted by the prediction unit 36) by the comparing unit 38 to the billing destination (terminal of the billing destination) of the delivery fee.

Hereinafter, a flow of processing performed by the processor 10 will be described with reference to FIG. 4. As shown in FIG. 4, in a case where the delivery is completed, an input of the delivery destination site work amount is performed, and in a case where the delivery destination site work amount is input, the calculation unit 32 calculates the delivery fee based on a current delivery record. In addition, the prediction unit 36 predicts the delivery fee based on the past delivery record. Next, the two delivery fees (the delivery fee calculated by the calculation unit 32 and the delivery fee predicted by the prediction unit 36) are compared, and a comparison result is notified to the billing destination for the delivery fee.

As described above, according to the first embodiment of the present invention, since the delivery fee is determined in consideration of the delivery destination site work amount, the burden on the delivery side can be reduced. In addition, since the comparison result between the current delivery fee (the delivery fee calculated by the calculation unit 32) and the delivery fee predicted from the past record (the delivery fee predicted by the prediction unit 36) is notified to the billing destination of the delivery fee, the comparison result between the delivery fees can be confirmed at the billing destination of the delivery fee, and the disadvantage such as the setting of the unreasonably high delivery fee can also be prevented.

Second Embodiment

In the first embodiment, the configuration in which the notification of the comparison result is performed regardless of the comparison result by the comparing unit 38 (the comparison result between the delivery fee calculated by the calculation unit 32 and the delivery fee predicted by the prediction unit 36) has been described as an example, but in the second embodiment, as shown in FIG. 5, the notification is performed in a case where the comparison result by the comparing unit 38 is out of the allowable range. Specifically, in a case where a difference between two delivery fees (the delivery fee calculated by the calculation unit 32 and the delivery fee predicted by the prediction unit 36) is out of the allowable range (for example, the difference is 1,000 yen or more, or one delivery fee is 1.5 times or more another delivery fee), the notification unit 40 notifies that fact.

As a result, according to the second embodiment, even though the difference between the two delivery fees is within the allowable range and it is considered that there is no disadvantage such as an unreasonably high delivery fee being set, it is possible to prevent a problem in which it takes time and effort to confirm the two delivery fees, or a problem in which confusion occurs due to notification of two delivery fees having the same amount. In the description of the second embodiment and subsequent embodiments, the same members as those described above are denoted by the same reference numerals, and the description thereof will be omitted.

Third Embodiment

Figure 7:
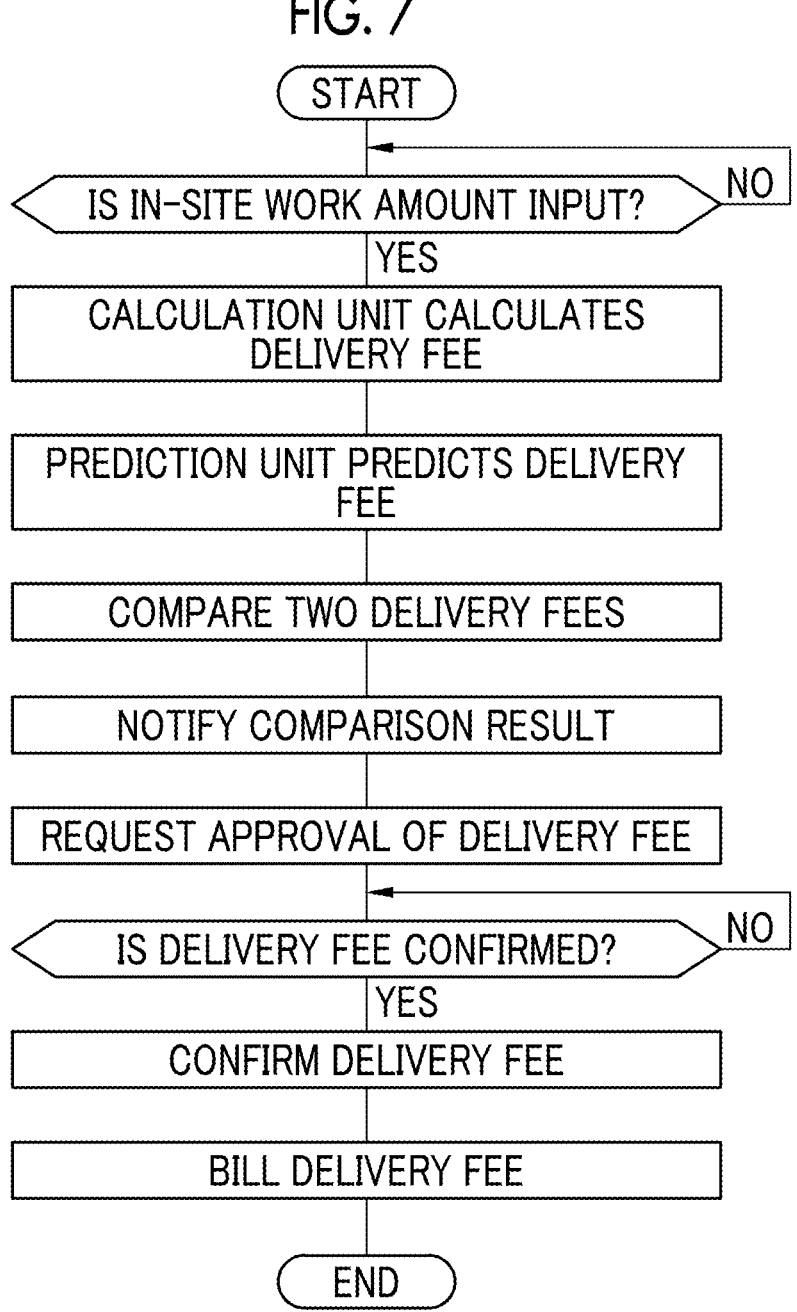
FIG. 7 is a flowchart showing a flow of processing of a third embodiment.

As shown in FIG. 6, in the third embodiment, the processor 10 functions as an approval request unit 50 in addition to the receiving unit 30, the calculation unit 32, the storage unit 34, the prediction unit 36, the comparing unit 38, and the notification unit 40 described above. As shown in FIG. 7, the approval request unit 50 requests the approval of the current delivery fee (the delivery fee calculated by the calculation unit 32) from the billing destination of the delivery fee (the terminal of the billing destination) in synchronization with the notification of the notification unit 40. After that, in a case where the delivery fee is approved by the billing destination, the delivery fee is confirmed, and billing is performed to the billing destination.

As described above, in the third embodiment, since the approval of the current delivery fee is requested, it is possible to more reliably prevent the disadvantage to the billing destination of the delivery fee. In the third embodiment, as in the second embodiment, the notification of the comparison result may be performed only in a case where the difference between the delivery fee calculated by the calculation unit 32 and the delivery fee predicted by the prediction unit 36 is out of the allowable range. In addition, a configuration may be adopted in which the approval of the delivery fee is requested only in a case where a difference between the delivery fee calculated by the calculation unit 32 and the delivery fee predicted by the prediction unit 36 is out of the allowable range.

Fourth Embodiment

Figure 8:
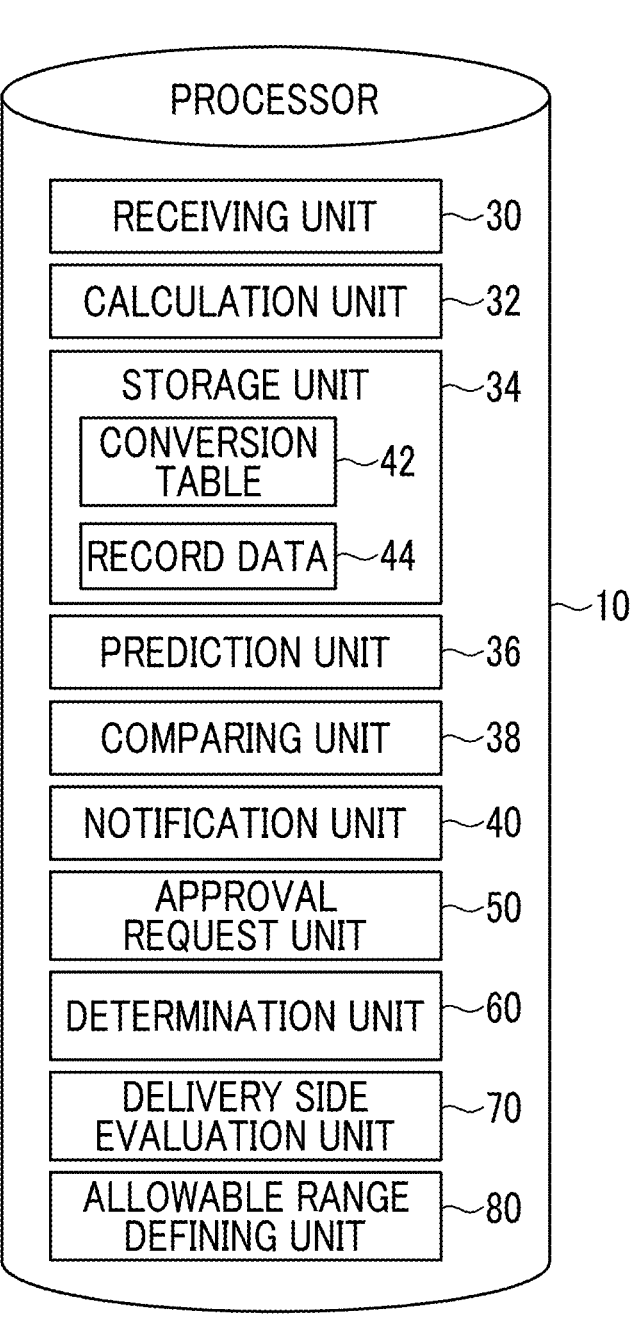
FIG. 8 is an explanatory diagram showing a configuration of the processor.

As shown in FIG. 8, in the third embodiment, the processor 10 functions as a determination unit 60, a delivery side evaluation unit 70, and an allowable range defining unit 80, in addition to the receiving unit 30, the calculation unit 32, the storage unit 34, the prediction unit 36, the comparing unit 38, the notification unit 40, and the approval request unit 50 described above.

In a case where the comparison result by the comparing unit 38 is out of the allowable range, the determination unit 60 determines whether the cause is due to the delivery side (delivery carrier 14) or the delivery destination 18. In this determination, for example, the determination basis (the delivery condition and the delivery destination site work amount (in-site work information)) of two delivery fees (the delivery fee calculated by the calculation unit 32 and the delivery fee predicted by the prediction unit 36) is notified to the delivery destination 18 (terminal 26 of the delivery destination 18), and the delivery destination 18 is requested to approve the determination basis of the delivery fee. Then, in a case where the determination basis of the delivery fee is approved, it is determined that the cause is due to the delivery destination 18. On the other hand, in a case where the determination basis of the delivery fee is not approved, it is determined that the cause is on the delivery side (delivery carrier 14). Although the example of requesting the approval of the determination basis of the delivery fee from the delivery destination 18 has been described, in a case where the billing destination of the delivery fee is the same as the delivery destination 18 and a case where the request by the approval request unit 50 described above is approved (the current delivery fee is approved), the determination basis of the delivery fee may be considered to be approved.

The delivery side evaluation unit 70 evaluates the delivery carrier that undertakes the delivery by using the determination result of the determination unit 60. Specifically, as the number (and/or the frequency) of cases where it is determined that the cause of the comparison result by the comparing unit 38 is out of the allowable range is due to the delivery side (delivery carrier) is larger (higher), the evaluation of the delivery carrier that undertakes the delivery is lowered. Of course, a configuration may be adopted in which the evaluation of the delivery carrier that undertakes the delivery is performed in consideration of not only the determination result of the determination unit 60 but also whether the delivery condition such as the delivery time is satisfied.

The allowable range defining unit 80 sets (defines) an allowable range (a range in which the comparison result by the comparing unit 38 is allowed) for each delivery carrier according to the evaluation of the delivery carrier. Specifically, the allowable range (allowable range individually applied to each delivery carrier) for each delivery carrier is set so that the allowable range is wider (larger) as the evaluation of the delivery carrier is higher.

Figures 9, 10:
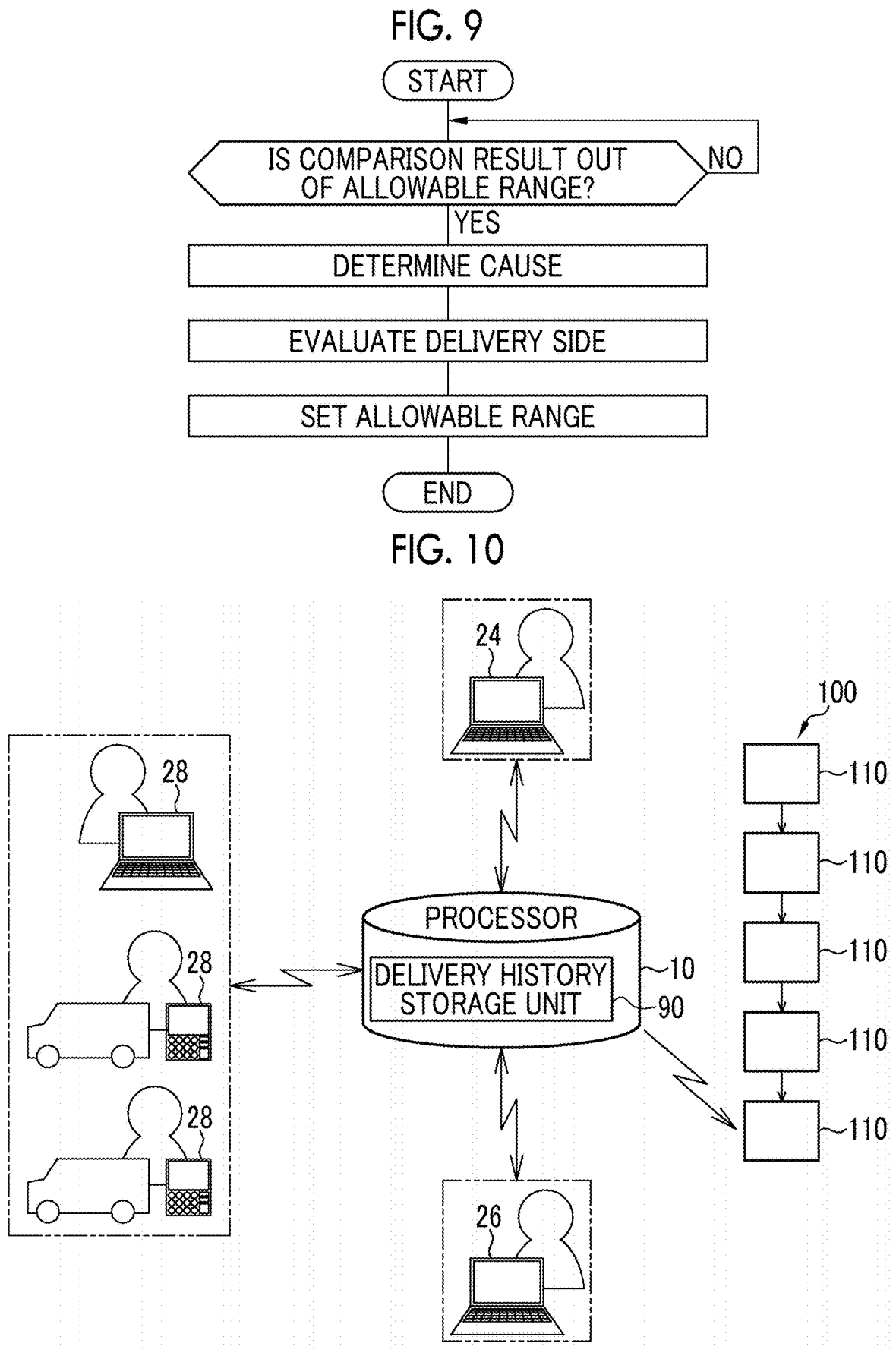
FIG. 9 is a flowchart showing a flow of processing of a fourth embodiment.
FIG. 10 is an explanatory diagram of a configuration in which delivery records are stored on a blockchain.

FIG. 9 shows a flow of processing in the fourth embodiment. As shown in FIG. 9, in the fourth embodiment, in a case where the comparison result by the comparing unit 38 is out of the allowable range, it is determined whether the cause is on the delivery side (delivery carrier 14) or on the delivery destination 18, and the delivery carrier 14 is evaluated by using the determination result. Then, the allowable range to be applied to the delivery carrier 14 is set by using this evaluation.

Fifth Embodiment

In the above-described embodiment, the delivery record is stored in the storage unit 34 as the record data 44, but as shown in FIG. 10, in the fifth embodiment, the processor 10 functions as a delivery history storage unit 90 and stores the delivery record on a blockchain 100. The delivery record is a history of processing related to the delivery, and as described above, includes the identification information of the consignor 16, the identification information of the delivery destination 18, the identification information of the delivery carrier 14, the type of the package, the delivery condition, the basic delivery fee or the additional amount, and the delivery destination site work amount or the in-site work information that is the basis of the additional amount.

The blockchain 100 is constructed by a blockchain network composed of the terminal 24 of the consignor 16, the terminal 26 of the delivery destination 18, the terminal 28 of the delivery carrier, and the like, and is obtained by linking blocks 110 including data indicating a delivery record of each delivery and a hash value obtained by hashing data indicating the delivery record in a previous delivery in time series.

Figure 11:
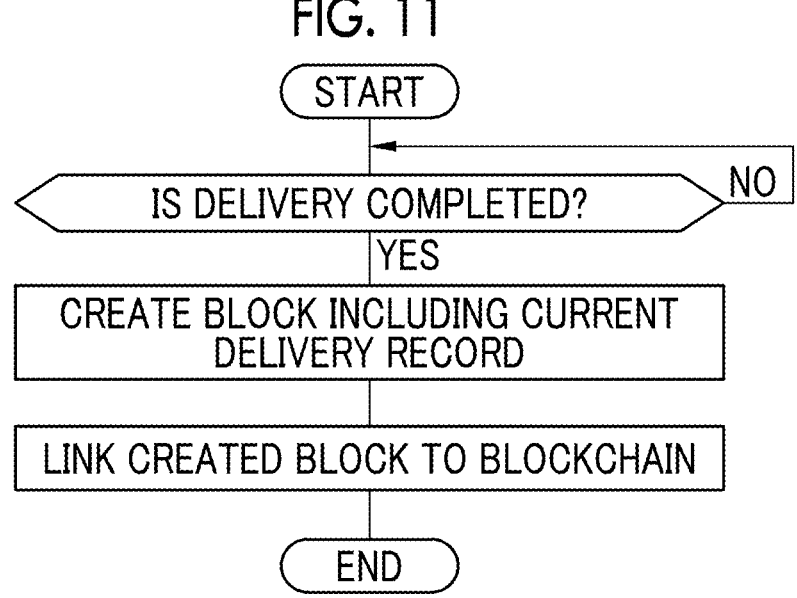
FIG. 11 is a flowchart showing a flow of processing of a fifth embodiment.

As shown in FIG. 11, in a case where the current delivery is completed, the delivery history storage unit 90 generates a new block 110 including the delivery record related to this delivery and the hash value obtained by hashing the delivery record related to the previous delivery, and links the new block 110 to the blockchain 100. In this way, it is possible to enhance the clarity and tamper resistance of the delivery history. In the fifth embodiment, a configuration may be adopted in which a reward (such as token) is given in accordance with cooperation with the blockchain network, such as processing, registration, and storage of data. In addition, a configuration may be adopted in which the billing or payment of the delivery fee is performed by using a smart contract.

In the above-described embodiment, the hardware structures of processing units that execute various types of processing, such as the receiving unit 30, the calculation unit 32, the storage unit 34, the prediction unit 36, the comparing unit 38, the notification unit 40, the approval request unit 50, the determination unit 60, the delivery side evaluation unit 70, the allowable range defining unit 80, and the delivery history storage unit 90, are various processors as shown below. The various processors include a central processing unit (CPU) that is a general-purpose processor functioning as various processing units by executing software (programs), a programmable logic device (PLD) that is a processor of which a circuit configuration can be changed after manufacturing, such as a field programmable gate array (FPGA), a dedicated electrical circuit that is a processor having a circuit configuration exclusively designed to execute various types of processing, and the like.

One processing unit may be configured by one of various processors, or may be configured by a combination of two or more processors of the same or different kinds (for example, a combination of a plurality of FPGAs or a combination of a CPU and an FPGA). Further, a plurality of processing units may be composed of one processor. As an example in which one processor constitutes a plurality of processing units, first, there is a form in which one processor is configured by a combination of one or more CPUs and software and the processor functions as the plurality of processing units, as represented by a computer such as a client and a server. Second, there is a form in which a processor that implements functions of the entire system including the plurality of processing units with one integrated circuit (IC) chip is used, as represented by a system on chip (SoC) or the like. Accordingly, the various processing units are configured using one or more of the various processors as a hardware structure.

Further, the hardware structures of the various types of processors are, more specifically, an electric circuit (circuitry) in a form in which circuit elements such as semiconductor elements are combined.

EXPLANATION OF REFERENCES

10: processor (delivery fee calculation device)
12: delivery support system 14: delivery carrier
16: consignor
18: delivery destination
20: delivery destination company
22: site
24: terminal (terminal of consignor)
26: terminal (terminal of delivery destination)
28: terminal (terminal of delivery carrier)
30: receiving unit
32: calculation unit
34: storage unit
36: prediction unit
38: comparing unit
40: notification unit
42: conversion table
44: record data
50: approval request unit
60: determination unit
70: delivery side evaluation unit
80: allowable range defining unit
90: delivery history storage unit
100: blockchain
110: block

What is claimed is:

1. A delivery fee calculation device comprising:
a processor,
wherein the processor
receives an input of a delivery destination site work amount indicating a work amount of a delivery side that occurs from reaching a delivery destination address to completing delivery, the input of the delivery destination site work amount being received as record data including the delivery destination site work amount, the record data including a movement trajectory obtained from an IC tag attached to a delivered package or from a drive recorder mounted on a vehicle used for delivery,
calculates a delivery fee using the delivery destination site work amount, the delivery fee being calculated using the record data,
stores a correspondence relationship between a delivery destination and the delivery destination site work amount as a past delivery record, the correspondence relationship being stored as past record data on a blockchain,
predicts the delivery fee in a case where a new delivery request is received, using the correspondence relationship,
compares the predicted delivery fee with a delivery fee calculated after achievement of the delivery request, and
notifies a billing destination for the delivery fee of a comparison result,
wherein the processor is configured to receive the input of the delivery destination site work amount from a delivery carrier terminal, the input being autonomously generated based on sensor data from the delivery carrier terminal,
wherein the processor is configured to calculate the delivery fee using the delivery destination site work amount and at least one real-time parameter selected from a group consisting of: delivery time, route data, and environmental conditions,
wherein the processor is configured to store the correspondence relationship between the delivery destination and the delivery destination site work amount as the past delivery record in a blockchain database to ensure tamper-resistance and transparency,
wherein the processor is configured to predict the delivery fee for the new delivery request using the correspondence relationship stored, the correspondence relationship being stored in the blockchain database, and
wherein the processor is configured to autonomously notify the billing destination for the delivery fee of the comparison result via a secure, authenticated communication channel, wherein the notification triggers an automated approval workflow recorded in the blockchain database.

2. The delivery fee calculation device according to claim 1,
wherein the processor performs the notification in a case where the comparison result is out of a predetermined allowable range.

3. The delivery fee calculation device according to claim 2,
wherein the processor requests approval of the delivery fee calculated after the achievement of the delivery request from the billing destination in a case where the comparison result is out of the allowable range.

4. The delivery fee calculation device according to claim 3,
wherein the processor determines whether a cause of the comparison result being out of the allowable range is due to the delivery destination or the delivery side in a case where the comparison result is out of the allowable range.

5. The delivery fee calculation device according to claim 4,
wherein the processor
receives an input of in-site work information that is a determination basis of the delivery destination site work amount,
presents the in-site work information and requests the approval,
determines that the cause is due to the delivery destination in a case where the request for the approval is accepted, and determines that the cause is due to the delivery side in a case where the request for the approval is not accepted.

6. The delivery fee calculation device according to claim 5,
wherein the processor evaluates a reliability degree of the delivery side by using at least one of a number or a frequency of cases where the comparison result is out of the allowable range as a result of the determination.

7. The delivery fee calculation device according to claim 6,
wherein the processor defines a size of the allowable range based on the reliability degree of the delivery side.

8. The delivery fee calculation device according to claim 1,
wherein the processor stores a history of processing related to the delivery on a blockchain.

9. The delivery fee calculation device according to claim 3,
wherein the processor is configured to record the approval or a rejection of the delivery fee in the blockchain database.

10. The delivery fee calculation device according to claim 4,
wherein the processor is configured to record the determination of whether the cause of the comparison result being out of the allowable range is due to the delivery destination or the delivery side in the blockchain database.

11. The delivery fee calculation device according to claim 5, wherein the processor is configured to record the in-site work information and the approval status in the blockchain database.

12. The delivery fee calculation device according to claim 6, wherein the processor is further configured to store the reliability degree of the delivery side in the blockchain database.

13. The delivery fee calculation device according to claim 8, wherein the processor is further configured to store a history of processing related to the delivery, including delivery fee calculations, approvals, and notifications, in the blockchain database.

\* \* \* \* \*